No. 767,395. PATENTED AUG. 16, 1904.
W. H. DOBLE.
MACHINE FOR SETTING UP AND FILLING CARTONS OR THE LIKE.
APPLICATION FILED JAN. 4, 1904.
NO MODEL.
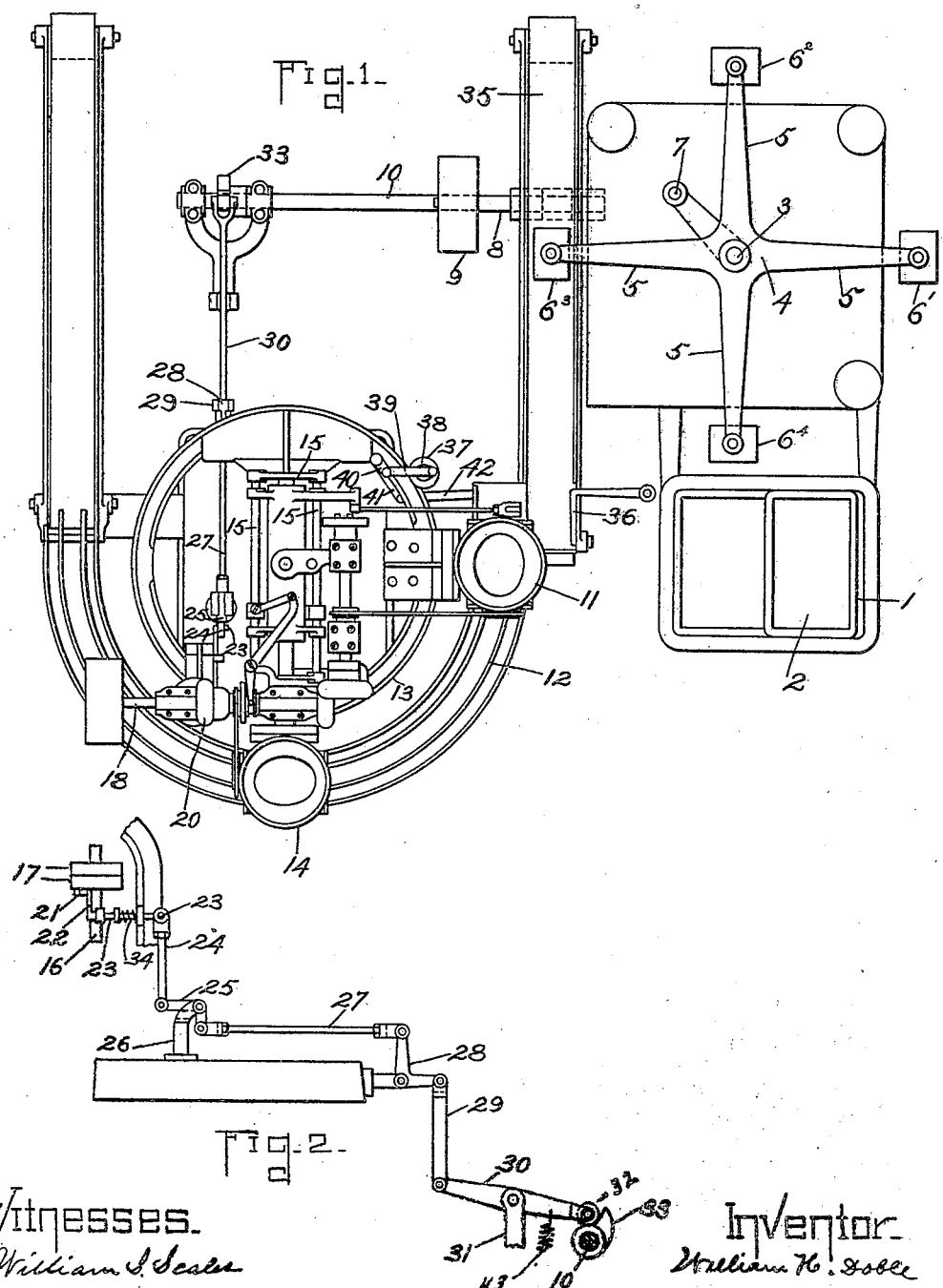
Witnesses.
William I. Scales
George P. Dike
Inventor
William H. Doble
by William A. Copeland
attorney.

No. 767,395. Patented August 16, 1904.

UNITED STATES PATENT OFFICE.

WILLIAM H. DOBLE, OF QUINCY, MASSACHUSETTS, ASSIGNOR TO PNEUMATIC SCALE CORPORATION, A CORPORATION OF MAINE.

MACHINE FOR SETTING UP AND FILLING CARTONS OR THE LIKE.

SPECIFICATION forming part of Letters Patent No. 767,395, dated August 16, 1904.

Original application filed February 1, 1902, Serial No. 92,143. Divided and this application filed January 4, 1904. Serial No. 187,630. (No model.)

*To all whom it may concern:*

Be it known that I, WILLIAM H. DOBLE, of Quincy, in the county of Norfolk and State of Massachusetts, have invented certain new and useful Improvements in Machines for Setting Up and Filling Cartons or the Like, of which the following is a specification.

This application is a branch of my application filed February 1, 1902, Serial No. 92,143, on which Patent No. 736,237 was granted August 11, 1903, the examiner having ordered a division between the subject-matter of the present application and the remaining claims of the original appplication, and in making the amendment which took out of said original application the subject-matter of this application I expressly stated that I reserved the right to embody it in a branch application.

The object of the present invention is to produce a machine to take cartons in their knocked-down or flattened form, in which the overlapping sides have already been pasted and the flaps for forming the top and bottom have been left spread out, and to square out and set up the cartons and turn and seal the flaps which form the bottom, then automatically transfer them to a weighing and filling apparatus which automatically supplies the cartons with a predetermined amount of material, the operation and speed of the weighing and filling mechanism being controlled by the setting-up mechanism in such manner that the weighing and filling mechanism can go through its operations only as fast as the setting-up mechanism supplies it with cartons to be filled, and if the setting-up mechanism stops the weighing and filling mechanism will also stop.

In Patent No. 633,953, dated September 26, 1899, to Doble and Scales, there was shown and described a machine for setting up and filling cartons in which the setting-up mechanism was controlled by the weighing and filling mechanism; but it is found that greater efficiency can be maintained and better results secured by making the weighing and filling mechanism dependent upon the setting-up mechanism.

It is important that the filling mechanism should not operate unless a carton is provided to be filled, and it is also important that there should be ample time given for thorough work in setting up the cartons, while, on the other, hand it is desirable that there should be an advance or reserve supply of set-up cartons on the conveyer between the setting up and filling mechanisms. If the weighing and filling mechanism controls the setting-up mechanism, there is a liability that the carton may receive its load and the carriers begin to move without giving sufficient time for the setting-up mechanism to properly do its work.

The invention will now be fully described and the novel features thereof will be particularly pointed out in the claims at the close of the specification.

In the drawings, Figure 1 is a plan of a machine embodying the present invention, showing a carton-setting-up machine like that shown in Patent No. 736,237, of which this application is a division, as already stated, and a weighing and filling machine substantially like that shown in my Patent No. 720,008, dated February 10, 1903, or Patent No. 708,627, dated September 9, 1902, with the exception that some of the special features of those patents are not shown herein, and showing herein the connecting mechanism by means of which the carton-setting-up mechanism controls the weighing and filling mechanism. Fig. 2 is a detail showing the connections between the setting-up mechanism and the weighing and filling mechanism.

The details of the setting-up mechanism and the weighing and filling mechanism, apart from the connections between them which illustrate the present invention, are not shown herein, because it is assumed they they will be well understood by reference to the other patents granted on my application.

So far as deemed desirable to the understanding of the present invention, the setting-up mechanism and the weighing mechanism will be described.

The cartons in their knocked-down or flattened form are stacked in a hopper 1 or other suitable receptacle, from which the bottom one of the stack is drawn out at each operation by a sliding carriage 2. Mounted on an intermittently-rotating shaft 3 is a spider-head 4, having a series of radiating arms 5, which carry the forming-blocks 6' 6² 6³ 6⁴. The shaft 3 has an intermittent motion turning at each period of movement through an arc sufficient to bring the blocks in successive rotation into positions for one block to receive a new carton and for the cartons on the other blocks to undergo the several steps in the process of gluing and folding the flaps and stripping the cartons from the blocks and delivering them to the carrier which removes them to the weighing and filling mechanism.

The particular mechanism for giving the intermittent rotation to the shaft 3 forms no part of the present invention; but one form of mechanism for doing this is through a shaft 1 and intermediate mechanism—for instance, a spur disk, such as shown in said Patent No. 736,237.

The particular means for opening out the cartons and placing them on the forming-blocks and for gluing and folding the flaps to form the bottom of the carton and for removing the cartons from the blocks and depositing them in an upright position to be carried to the filling mechanism are not essential parts of the present invention. One means for performing these operations is shown and described in said Patent No. 736,237.

Shaft 7 is driven by shaft 8, through any suitable connection, as by bevel-gears, (not shown,) and shaft 8 has a driving-pulley 9. Shaft 7 also has driving connection with shaft 10, as by gear and pinion or other suitable means, and shaft 10 actuates the carriage 2 through suitable intermediate mechanism to bring one carton from the stack at each rotation of said shaft, and shaft 10 makes one revolution for each cycle of movement of the setting-up mechanism—that is, for each movement of the spider in which a finished carton is presented.

The weighing and filling mechanism represented in the drawings is of the so-called "double-hopper" type, in which the material to be weighed and packed is supplied in part to each receptacle through one hopper and then the receptacle is carried to the scale, where it receives the completion of its load through another hopper.

The weighing and filling mechanism is briefly described as follows: The carton receives its preliminary supply through a hopper 11, whence it is carried along a track 12 by fingers (not shown) which project from the intermittently-rotating ring 13, to the second hopper 14, which is called the "drip-hopper" or "scale-hopper," where it receives the completion of its load and is weighed. When the scale tips, a reciprocating member 15 is caused to move in a direction to close the scale-hopper feed. The carrier-ring 13 is rotated intermittently by a shaft 16, having on its lower end a pinion (not shown, the shaft being broken away) which engages with said ring, and a clutch 17 which connects said pinion-shaft 16 with a driving-shaft 18 through a miter-gear (not shown) fast to the upper member of clutch 17, and a miter-gear (not shown, but inclosed in case 20) on shaft 18. The lower member of the clutch 17 is fast to shaft 16. Means are provided (not shown) by which the two members of the clutch 17 may be locked together, and when so engaged the shaft 16 and the carrier-ring 13 will revolve. Connected with the locking device is a pawl-lever 21, by means of which the locking mechanism of the clutch may be disengaged. A spring (not shown) tends to hold pawl-lever 21 in such position that the members of the clutch will be engaged; but a finger 22 normally stands in such position that it engages lever 21 and holds the members of the clutch disengaged. The clutch mechanism thus briefly described is fully shown and described in Patent No. 720,008, already referred to. This finger 22 is actuated by shaft 10 through connecting mechanism, as will be described, whereby at each rotation of shaft 10 the finger 22 will be tripped from engagement with lever 21, so that the members of clutch 17 will become engaged and rotate shaft 16; but the finger 22 will immediately be turned back by spring 34 into position where it will intercept lever 21 as soon as the clutch 17 and shaft 16 have completed one revolution, and thereby stop the shaft 16.

The connecting mechanism whereby the shaft 10 actuates the finger 22 may be varied, but the form shown is as follows: Finger 22 is the turned-up end of a right-angled bent rocking lever 23, the other end of which is connected with a link 24, whose lower end is pivoted to one arm of bell-crank lever 25, which is pivoted to a support 26. The other arm of lever 25 is connected by link 27 with bell-crank 28, which is connected by link 29 with lever 30, fulcrumed on a support 31. On the end of lever 30 is a roller 32, which at each rotation of shaft 10 is engaged by a cam 33, carried on said shaft. The form of cam 33 and the speed of shaft 10 in relation to the speed of shaft 16 are such that the finger 22 will come back into its intercepting position before the clutch 17 has completed its rotation. A spring 43 holds the roller 32 in engagement with the cam 33.

The normal speed of the weighing and filling mechanism is so adjusted that a carton will receive its load and the carrier-ring 13 be ready to move before the shaft 10 has completed one revolution.

The block 6³ is in the position it occupies when the carton is completed and ready to be stripped from the block. When stripped from the block, it is deposited on a continuously-moving carrier-belt 35, which carries it toward the filling mechanism, and it is removed from the belt 35 by a reciprocating plate 36, which is actuated to move transversely of the movement of the belt. The reciprocating plate 36 is actuated by means of a pinion 37, which engages with the carrier-ring 13, and crank 38, connecting-rod 39, levers 40 and 41, and connecting-rod 42. The mechanism for thus reciprocating the plate 36 is fully shown and described in Patent No. 708,627, already mentioned.

It is an advantage to have a number of set-up cartons already on the belt 35 before the weighing-machine starts, so that the operator may have time to inspect them before they are delivered to the weighing and filling mechanism. This may be done by running a number through the setting-up mechanism before starting the carrier of the weighing mechanism.

What I claim is—

1. In combination, mechanism for opening and setting up knocked-down cartons, mechanism for filling the cartons, and connecting mechanism actuated by the setting-up mechanism whereby the setting-up mechanism controls the operation of the filling mechanism.

2. In combination, mechanism for opening and setting up knocked-down cartons, mechanism for filling the cartons, mechanism which transfers the empty cartons from the setting-up mechanism to the filling mechanism, and connecting mechanism actuated by the setting-up mechanism whereby the setting-up mechanism controls the periods of operation of the filling mechanism.

3. In combination, mechanism for opening and setting up knocked-down cartons, mechanism for filling the cartons, a constantly-moving carrier which carries the set-up cartons to the filling mechanism, mechanism for driving said carrier mechanism which deposits the set-up cartons on said carrier, a carton-carrier for the filling mechanism, and connecting mechanism whereby the driving mechanism of the setting-up mechanism controls the starting of the carrier of the filling mechanism, substantially as described.

In testimony whereof I have affixed my signature in presence of two witnesses.

WILLIAM H. DOBLE.

Witnesses:
WILLIAM A. COPELAND,
ROBERT WALLACE.